(12) United States Patent
Hall et al.

(10) Patent No.: US 10,961,766 B2
(45) Date of Patent: Mar. 30, 2021

(54) AUTOMATED SLIDING PANEL MECHANISM WITH RACK

(71) Applicant: Hall Labs LLC, Provo, UT (US)

(72) Inventors: David R. Hall, Provo, UT (US); Emily Brimhall, Alpine, UT (US); Jerome Miles, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 60 days.

(21) Appl. No.: 16/128,966

(22) Filed: Sep. 12, 2018

(65) Prior Publication Data

US 2019/0010748 A1 Jan. 10, 2019

Related U.S. Application Data

(63) Continuation-in-part of application No. 15/945,935, filed on Apr. 5, 2018, now Pat. No. 10,718,150, which is a continuation-in-part of application No. 15/867,431, filed on Jan. 10, 2018, and a continuation-in-part of application No. 15/822,394, filed on Nov. 27, 2017, now Pat. No. 10,822,857.

(60) Provisional application No. 62/528,288, filed on Jul. 3, 2017.

(51) Int. Cl.
| | |
|---|---|
| *E05F 15/635* | (2015.01) |
| *E05F 15/77* | (2015.01) |
| *E05F 15/71* | (2015.01) |
| *E05F 15/643* | (2015.01) |
| *E06B 3/46* | (2006.01) |
| *E05F 15/72* | (2015.01) |

(52) U.S. Cl.
CPC .......... *E05F 15/635* (2015.01); *E05F 15/643* (2015.01); *E05F 15/71* (2015.01); *E05F 15/77* (2015.01); *E06B 3/4609* (2013.01); *E05F 15/72* (2015.01); *E05Y 2201/434* (2013.01); *E05Y 2201/716* (2013.01); *E05Y 2201/722* (2013.01); *E05Y 2400/32* (2013.01); *E05Y 2400/42* (2013.01); *E05Y 2400/44* (2013.01); *E05Y 2400/85* (2013.01); *E05Y 2900/148* (2013.01)

(58) Field of Classification Search
CPC .. E05F 15/635; E05F 15/77; E05Y 2201/722; E05Y 2201/434; E05Y 2201/716; E05Y 2900/148; E05Y 2900/132
See application file for complete search history.

(56) References Cited

U.S. PATENT DOCUMENTS

| | | | | | |
|---|---|---|---|---|---|
| 1,757,751 | A | * | 5/1930 | Strauss | E05F 15/665 49/361 |
| 2,531,116 | A | * | 11/1950 | Donoghue | E05F 15/71 49/23 |
| 2,883,225 | A | * | 4/1959 | Akehurst | E05D 13/08 292/35 |
| 3,237,250 | A | * | 3/1966 | Scoville | E06B 3/4609 49/136 |

(Continued)

*Primary Examiner* — Justin B Rephann

(57) ABSTRACT

An automated sliding panel mechanism is disclosed. An automated sliding panel mechanism including a motor is configured to move a sliding window between a closed position and an open position, and includes a power source providing power to the motor, a rack consisting of rack teeth wherein a portion of the surface of the rack teeth are generally perpendicular to a plane, and a gear rotated by the motor and consisting of gear teeth, wherein the gear teeth are shaped to mesh with the rack teeth.

17 Claims, 10 Drawing Sheets

(56) References Cited

U.S. PATENT DOCUMENTS

| | | | | |
|---|---|---|---|---|
| 3,241,283 | A * | 3/1966 | Ahlgren | E06B 3/4609 49/425 |
| 5,261,187 | A * | 11/1993 | Prenger | E05F 15/635 49/362 |
| 5,351,441 | A * | 10/1994 | Hormann | E06B 11/045 49/362 |
| 5,355,624 | A * | 10/1994 | Bacon | E05F 15/635 49/280 |
| 5,515,650 | A * | 5/1996 | Machill | E06B 11/045 49/362 |
| 5,680,729 | A * | 10/1997 | Heffington | E05F 15/53 49/362 |
| 6,091,217 | A * | 7/2000 | Parsadayan | E05F 15/41 318/283 |
| 6,216,394 | B1 * | 4/2001 | Fenelon | E05F 15/689 49/349 |
| 6,267,168 | B1 * | 7/2001 | Davies | E05D 15/0604 160/23.1 |
| 6,481,160 | B1 * | 11/2002 | Kowalczyk | E05F 3/224 49/333 |
| 6,581,332 | B1 * | 6/2003 | Kim | E05F 15/77 49/358 |
| 8,474,186 | B2 * | 7/2013 | Dufour | B60J 1/1853 49/380 |
| 8,575,877 | B2 * | 11/2013 | Liu | E06B 9/322 250/200 |
| 2001/0011579 | A1 * | 8/2001 | Davies | E05D 15/0604 160/23.1 |
| 2004/0111970 | A1 * | 6/2004 | Fenelon | E05F 11/385 49/349 |
| 2004/0187390 | A1 * | 9/2004 | Celani | E05F 15/652 49/360 |
| 2004/0187391 | A1 * | 9/2004 | Fenelon | E05F 11/385 49/375 |
| 2004/0244295 | A1 * | 12/2004 | Derham | E05F 15/41 49/362 |
| 2006/0150520 | A1 * | 7/2006 | Hamazaki | E05B 65/08 49/449 |
| 2006/0163272 | A1 * | 7/2006 | Gamble | A47F 1/126 221/227 |
| 2008/0163553 | A1 * | 7/2008 | Liao | E05F 11/423 49/362 |
| 2010/0058683 | A1 * | 3/2010 | Bushberger | E06B 1/705 52/209 |
| 2012/0023827 | A1 * | 2/2012 | Hancock | E05F 15/635 49/360 |
| 2012/0111133 | A1 * | 5/2012 | Pietrala | E21C 29/02 74/89.17 |
| 2012/0241564 | A1 * | 9/2012 | Parker | B64C 9/22 244/214 |
| 2013/0186001 | A1 * | 7/2013 | Cui | E06B 9/68 49/31 |
| 2014/0047768 | A1 * | 2/2014 | Vaknin | E05D 15/06 49/25 |
| 2014/0124293 | A1 * | 5/2014 | Eversole | B66F 3/02 182/103 |
| 2015/0020617 | A1 * | 1/2015 | Neumann | F16H 19/04 74/30 |
| 2015/0027246 | A1 * | 1/2015 | Sattler | B21D 28/265 74/30 |
| 2017/0101816 | A1 * | 4/2017 | Kozonasky | E05F 15/77 |
| 2018/0023333 | A1 * | 1/2018 | Lange | E05D 13/006 49/349 |
| 2018/0355660 | A1 * | 12/2018 | Noy | E05F 15/641 |
| 2018/0363356 | A1 * | 12/2018 | Hohwart | E05F 15/635 |

\* cited by examiner

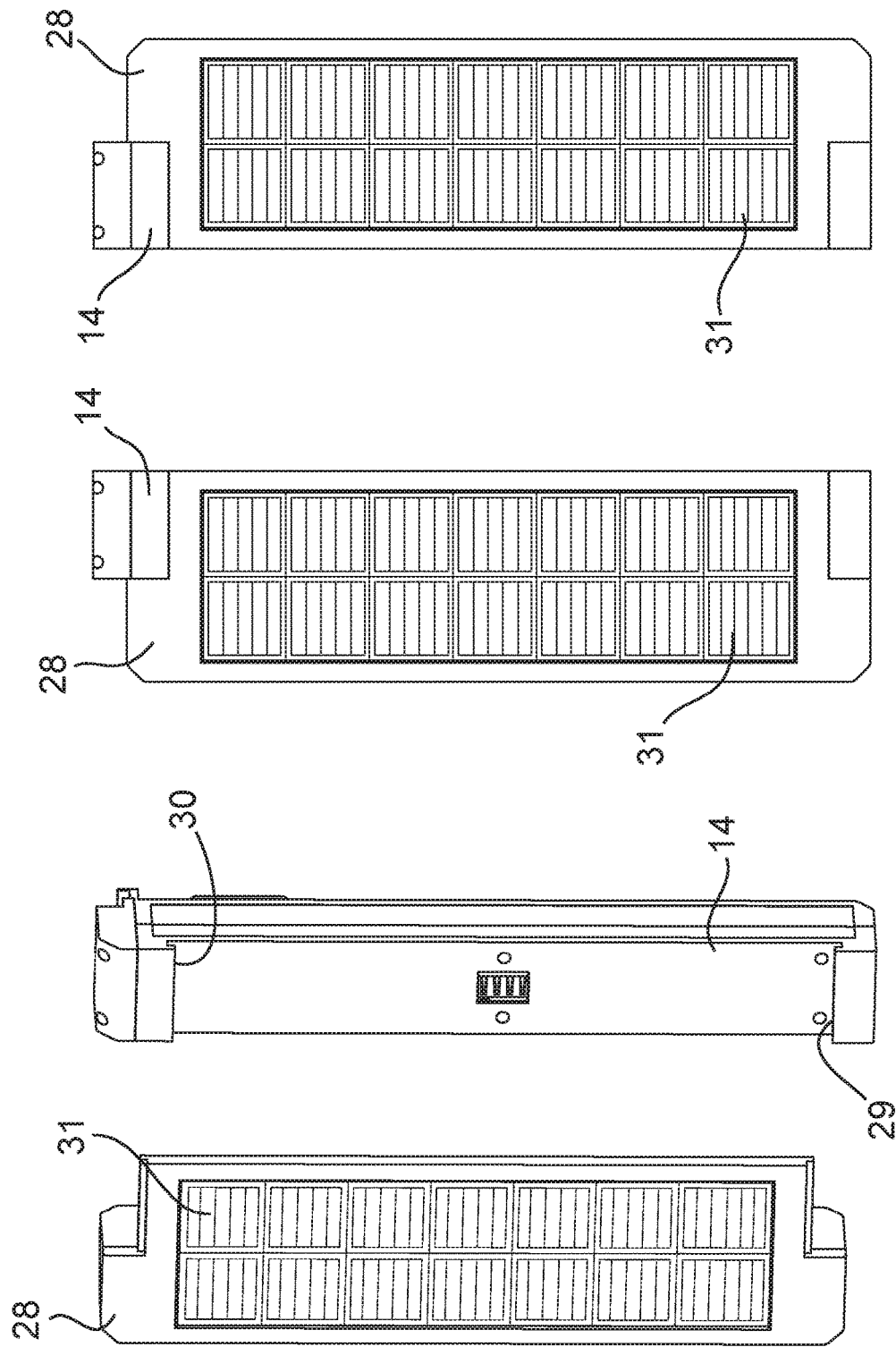

AUTOMATED SLIDING PANEL MECHANISM WITH RACK

CROSS-REFERENCE TO RELATED APPLICATIONS

This application is a continuation in-part of U.S. patent application Ser. No. 15/945,935, filed Apr. 5, 2018 and entitled Gear-Driven Automated Window or Door System, which is, in turn, a continuation-in-part of U.S. patent application Ser. No. 15/867,431, filed Jan. 10, 2018 and entitled Motorized Gear Sliding Window or Door System, which is, in turn, a continuation-in-part of U.S. patent application Ser. No. 15/822,394, filed Nov. 27, 2017 and entitled Retrofittable Motorized Gear Sliding Window or Door System, which is, in turn, a continuation-in-part of U.S. Provisional Patent Application No. 62/528,288, filed Jul. 3, 2017 and entitled Retrofittable Motorized Gear Sliding Window The entire disclosures of these prior applications are incorporated herein by reference.

TECHNICAL FIELD

This invention relates generally to smart home devices and specifically to automated sliding panels.

BACKGROUND

Many improvements and developments have been made in the field of Smart Home devices. However, many devices, especially existing devices in a residence or business (such as windows, window coverings and doors, for example), simply were not designed or configured to be smart.

Traditionally, windows are opened and closed manually for ventilation, energy or security or safety needs. For example, a window or door may be closed and locked while the owners are away from home to protect the home from entry by an intruder. A window or door may be opened in order to vent noxious gases from the interior of the home to the outside. When the inside of the house is hot, a door or window may be opened to allow cooler outside air to enter the house.

In order to enable these traditional functions to be carried out in an automated smart system, motorized devices are needed to open and close the windows or doors.

SUMMARY

In a first aspect, the invention is an automated sliding panel mechanism, which includes a motor configured to move a sliding window between a closed position and an open position, and a power source providing power to the motor, a rack consisting of rack teeth wherein a portion of the surface of the rack teeth are generally perpendicular to a plane, and a gear rotated by the motor and consisting of gear teeth, wherein the gear teeth are shaped to mesh with the rack teeth.

In a second aspect, the disclosure provides an automated sliding panel mechanism wherein the sliding panel is a window, and wherein the gear may be a spur gear, a helical gear, or a worm gear. Furthermore, the gear includes at least 12 teeth. The rack includes at least six teeth per inch. In one embodiment, the rack is attached to a sliding component of the sliding window, and the gear is attached to a stationary component of the window. In another embodiment, the rack is attached to a stationary component of the sliding window, and the gear is attached to a sliding component.

In a third aspect, the disclosure provides an automated sliding panel mechanism including a controller that controls the motor, wherein the controller may be a smart phone running an app. Additionally, the end of the rack teeth that mesh with the gear are generally rounded. In another embodiment, the ends of the rack teeth that mesh with the gear are square. Also, the power source may be one or more batteries and the batteries may be charged by a solar panel on the automated sliding panel mechanism.

In a fourth aspect, the automated sliding panel mechanism attaches to a sliding window with an adhesive. Furthermore, the automated sliding panel mechanism may be attached to an upper portion or a lower portion of a sliding window, or to a first or second vertical side.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative, and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 1B depicts the motor assembly disconnected from the solar panel.

FIG. 1C depicts the solar panel attached to a first side of the motor assembly.

FIG. 1D depicts the solar panel attached to a second side of the motor assembly.

DETAILED DESCRIPTION

Figure 1A:
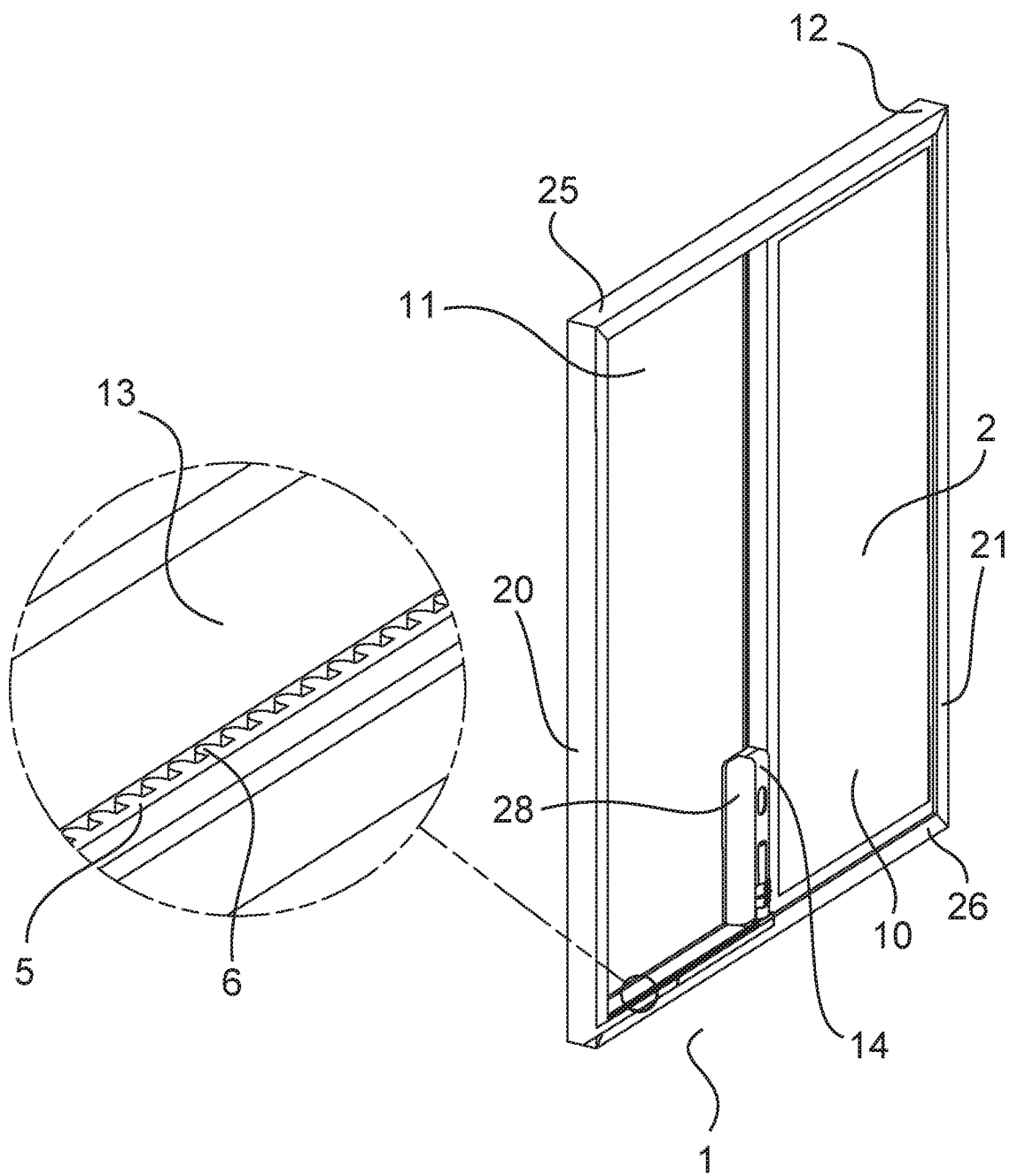
FIG. 1A is a perspective view of the automated sliding panel mechanism with rack.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

As used herein, "generally perpendicular" is meant to refer to a portion of the surface of the rack tooth being within five degrees of being exactly perpendicular, or at an angle of 90 degrees, to the plane. That is to say, a portion of the surface of the rack tooth is at an angle of between 85 degrees and 95 degrees to the plane.

It is useful to be able to open a window without having to do so manually. In many buildings, however, windows are not typically equipped with technology to open them automatically. This may be because it is expensive to build a building with automatic windows, or because automatic windows are a relatively new invention. Buildings that are comparatively old are not equipped with such technology.

There are, in response to this issue, ways to automate a window. However, where the window is opened or closed by means of a gear walking along a rack, a rack with slanted teeth may cause forces that push the gear teeth out of the rack. If the gear "jumps" the ra k, it cause the mechanism to malfunction, e.g. jam, or at least to lose its calibration for open and closed positions. It may also place strain on the motor that pushes the gear along the rack, ultimately causing the invention to break, or to wear out easily, as the motor is working harder to push the gear along the rack.

A sliding panel may be a door, window, or louver. In a preferred embodiment, the sliding panel is a window. A window is comprised of several components. Firstly, a frame which provides structure and is attached to the other components. The frame comprises a first vertical member and a second vertical member, as well as a first and second horizontal member. Secondly, a stationary component such as a first pane composed of glass or plastic and thirdly a sliding component such as a second pane composed of glass or plastic, both of which are disposed within the frame. Additionally, a channel through which the sliding component slides is attached to the frame. The components of a sliding window may be arranged such that the sliding component moves horizontally or vertically. For example, in one embodiment, the sliding component slides from a lower position to an upper position, or from an upper position to a lower position. As such, the channels allowing the sliding component to slide are positioned in a first vertical member and second vertical member. Alternatively, the sliding component slides from a first side to a second side, such as a left position to a right position, or a right position to a left position, and the channels are situated in the first and second horizontal members of the frame.

Henceforth, the term "plane" refers to the plane of the base of the rack. The rack is comprised of a base and teeth. The rack teeth are attached to the base and extend therefrom. The base is comprised of sides and forms a flat surface to which the rack teeth are attached. The surface from which the rack teeth extend forms the plane. Furthermore, the teeth are comprised of four sides and an upper surface. In a preferred embodiment, the upper surface is generally rounded, such that the surface is smooth and curved. Of the four sides of the rack tooth, the portion of the surface of the rack tooth that is generally perpendicular to the plane refers to the sides of the tooth that face the other teeth on the rack. The remaining two sides of the rack tooth are the sides that do not face the other rack teeth.

Now, referring to FIG. 1A, the automated sliding panel mechanism 1 is shown. A sliding window 2 is attached to the automated sliding panel mechanism 1. The sliding window 2 is composed of several parts. It comprises a sliding component 10, such as a glass pane, and a stationary component 11, such as a glass pane, mounted in a frame 12. The frame 12 consists of two vertical members, a first vertical member 20 and a second vertical member 21, as well as two horizontal members, a first horizontal member 25 and a second horizontal member 26. The rack 5 is attached to the outside of the window frame 12, specifically the second horizontal member 26. The rack teeth 6 mesh with the gear 3 which is powered by the motor to pull the sliding window 2 to an open position, wherein the sliding component 10 is fully or partially overlapping the stationary component 11, or to push the sliding window 2 into a closed position, wherein the sliding component 10 and the stationary component 11 do not overlap or the overlap is reduced. The opening and closing of the sliding window 2 is accomplished as the gear 3 walks along the rack 5. In this embodiment, the rack 5 is facing the sliding window 2, in particular the rack 5 is facing the stationary component 10 of the sliding window 2. In another embodiment, the rack 5 is attached to the outside of the window channel 13, such that the rack 5 faces the room or building in which the sliding window 2 is located. That is to say, the upper surface of the rack teeth are directed towards the room in which the automated sliding panel mechanism 1 is located. Additionally, the rack 5 may be attached to the stationary component 11, and the motor assembly 14, consisting of the motor 15 and the gear 3, may be attached to the sliding component 10. Alternatively, the rack 5 is attached to the sliding component 10 and the motor assembly 14 is attached to the fixed component 11.

Figure 2A:
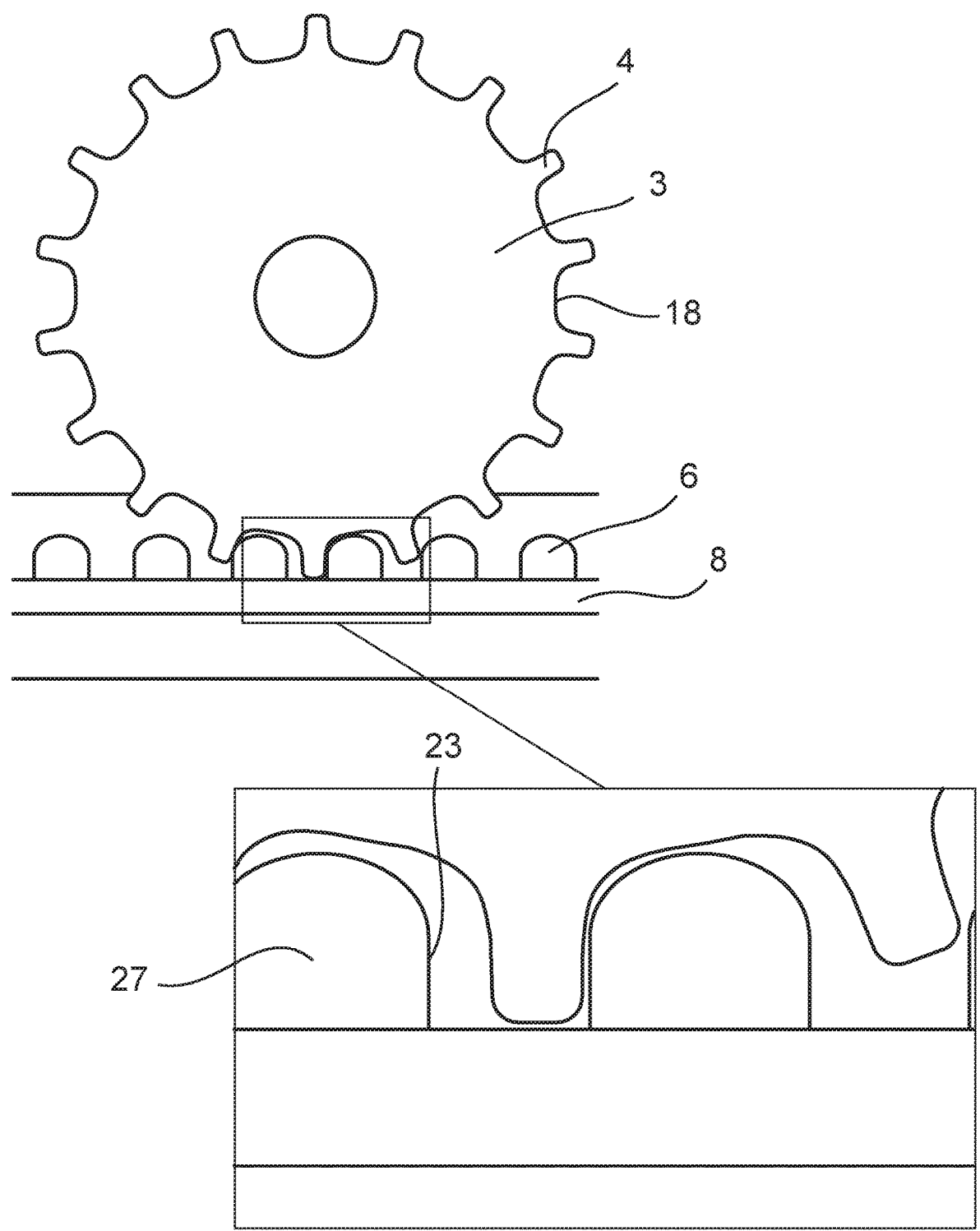
FIG. 2A depicts the rack and a spur gear meshed together.
Figure 2B:
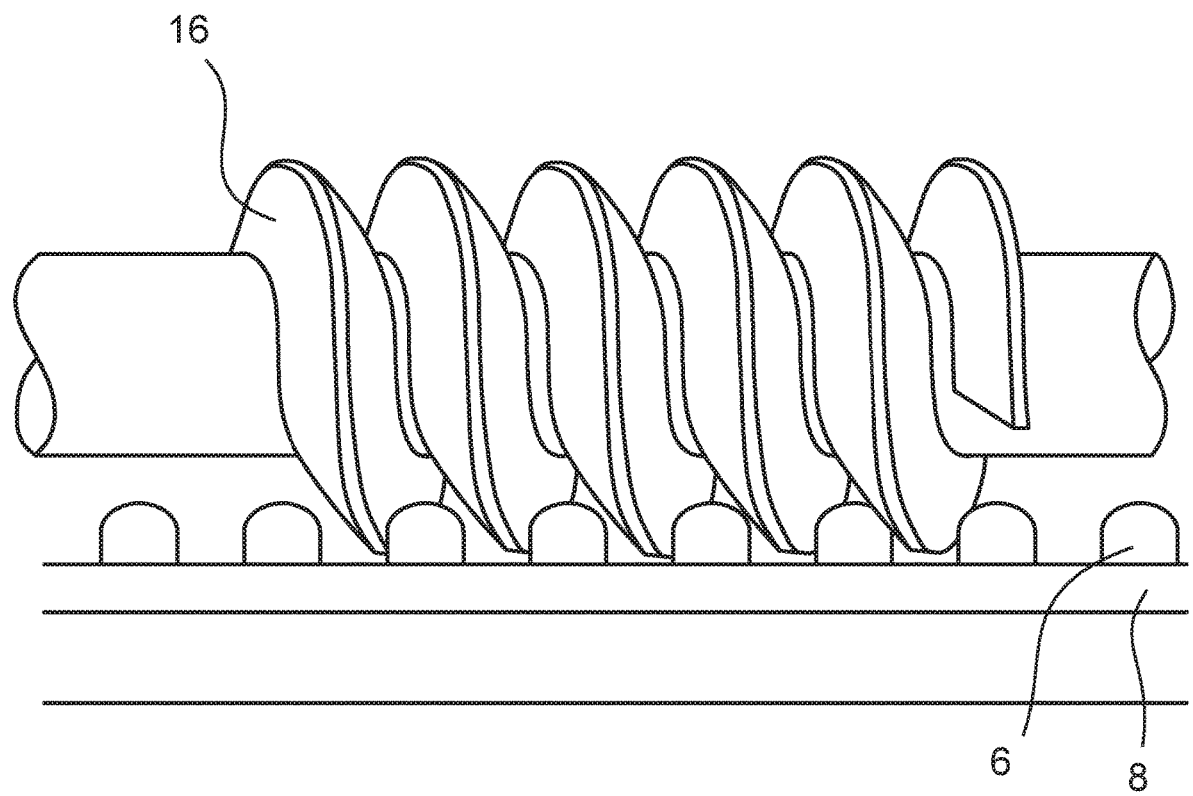
FIG. 2B depicts a worm gear meshed with the rack.
Figure 2C:
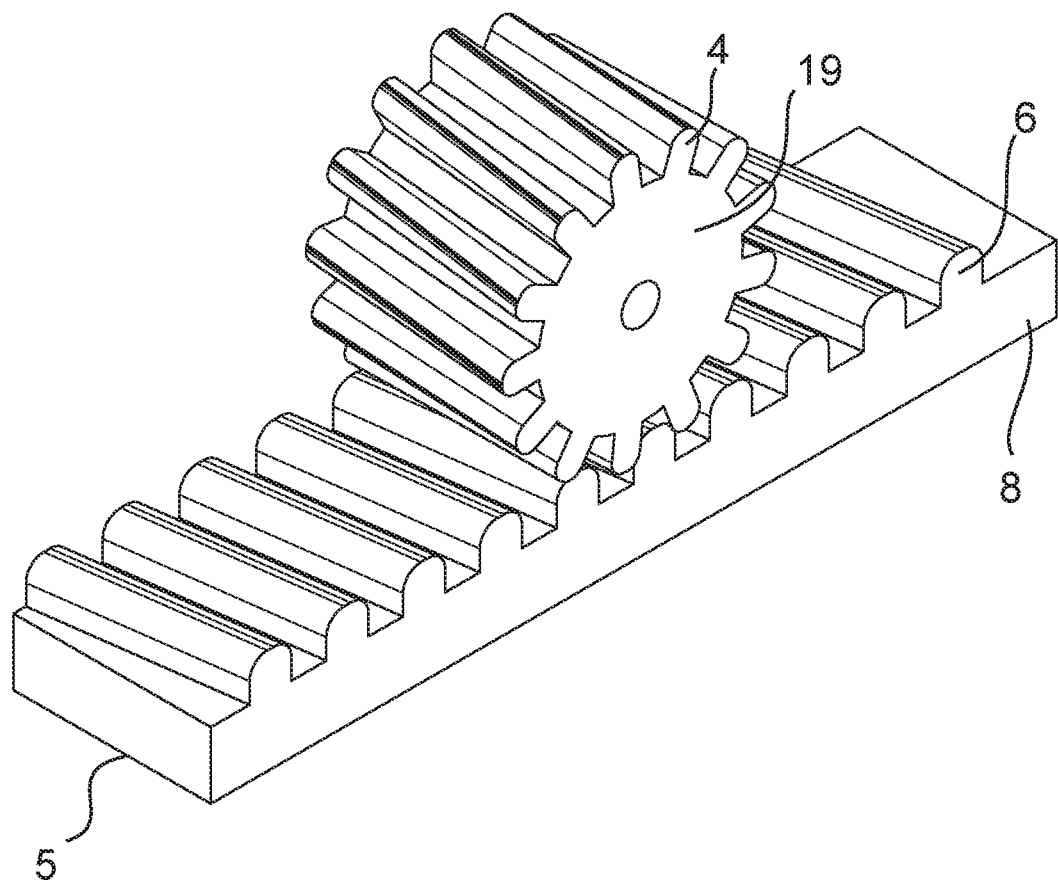
FIG. 2C depicts a helical gear meshed with the rack.
Figure 3:
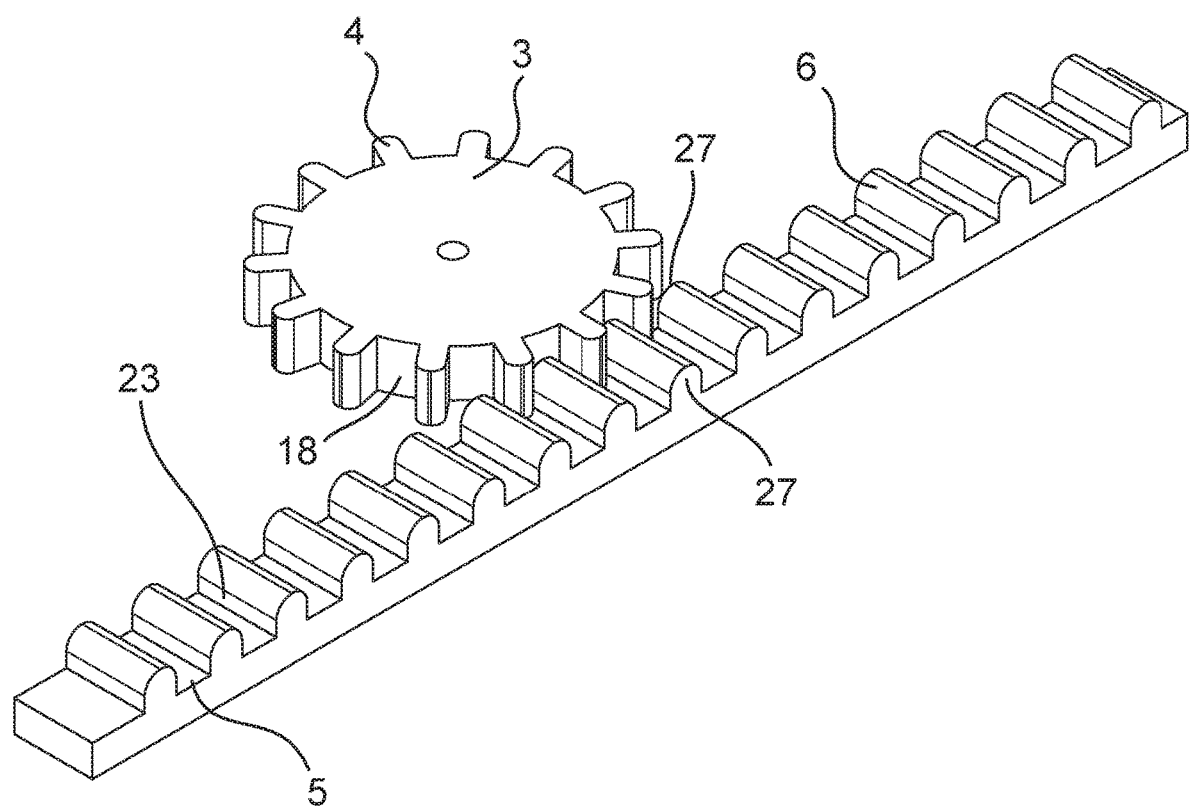
FIG. 3 depicts a perspective view of a gear meshed with the rack.

Preferably, the gear 3 is a spur gear as shown in FIGS. 1A and 2A. Alternatively, the gear can be a helical gear 14 as shown in FIG. 2C or worm gear 16 as shown in FIG. 2B. Also preferably, and as shown in FIGS. 1A and 2A, the teeth of the gear 3 extend outward from the center of the gear in the same plane that the teeth of the rack extend from the base. Alternatively, and as shown in FIG. 3, the teeth of the gear may extend in a place perpendicular to the plane that the teeth of the rack extend from the base.

In FIG. 1A, the sliding component 10 slides from the right to the left, or from the second side to the first side. As such, the rack 5 is attached to the second horizontal member 26 on the side closest to the first vertical member 20 of the frame 12. However, in other embodiments, the sliding component 10 slides from the right to the left, or from the first side to the second side. In this example, the rack 5 is attached to the second horizontal member 26 on the side closest to the second vertical member 21 of the frame 12. Alternatively, the rack may be attached to the first horizontal member 25 of the frame, or the upper portion of the frame 12. For example, wherein a sliding window 2 is configured such that the sliding component 10 slides from the left to the right (as seen in FIG. 1), the rack 5 may be attached to the first horizontal member 25 on the side closest to the first vertical member 20 of the frame. In an embodiment wherein the sliding component 10 of the sliding window slides from the right to the left, the rack 5 may be attached to the first horizontal member 25 on the side closest to the second vertical member 21 of the frame 12.

In one embodiment, the motor is powered by a battery. In certain embodiments the battery are rechargeable batteries and is powered by a solar panel 28. FIG. 1B depicts the motor assembly 14 disconnected from the solar panel 28. The solar panel 28 comprises a photovoltaic portion 31 to convert sunlight into electricity. When the solar panel 28 is attached to the motor assembly 14, the photovoltaic portion 31 is facing outside. The back of the motor assembly 14 is comprised of two lips, an upper lip 29 and a lower lip 30, wherein the solar panel 28 is configured such that it can slide between the lips of the motor assembly 14. The upper and lower lip on the motor assembly 14 permit the solar panel to attach to the motor assembly 14 from either side. As such, if a window opens from left to right or from right to left, a user can attach the solar panel 28 to the motor assembly 14. FIG. 1C depicts the solar panel 28 attached to a first side of the motor assembly 14. FIG. 1D depicts the solar panel 28 attached to a second side of the motor assembly 14.

The rack 5 may be attached to the sliding window 2 several ways. These include, but are not limited to: adhesive applied to the side of the of the rack without teeth, (a peel and stick option, putty, or glue), fastening devices such as nails or screws, or slide-on-track that rests on a horizontal member with the teeth on one side and the other side being smooth. In another example, the rack 5 is attached to the sliding window 2 with double-faced tape. Tape allows users to remove the automated sliding panel mechanism from their sliding window 2 with relative ease. Alternatively, users attach the rack 5 to the sliding window 2 with glue dots, pressure sensitive adhesives, epoxies, adhesive sheets. In another embodiment, the rack is molded into a first or second horizontal member. Similarly, the motor assembly is attached to a component of the sliding window 2, such as the stationary component 11 with an adhesive or fastening devices.

FIG. 2A depicts the rack 5, composed of the rack base 8 and the rack teeth 6, and the gear 3 meshed together. The rack teeth 6 fit into the space between the gear teeth 18 such that the gear 3 walks along the rack 5 and moves the sliding window 2. The rack tooth 6 is comprised of four sides and an upper surface and lower surface. The four sides comprise two sides of the rack tooth that face other rack teeth 23 and two sides of the rack tooth not facing other rack teeth 27. At least a portion of the side of the rack tooth facing other rack teeth 23 is generally perpendicular to the plane 17. The plane 17 is created by the flat surface of the rack base 8 to which the rack teeth 6 are attached, best displayed in FIG. 6. The sides of rack teeth that face other rack teeth 23 are generally perpendicular to the plane 17. This configuration allows the gear 3 teeth to push with a force normal to the direction of travel when moving along the rack 5. As such, this configuration allows all of the force of the gear to walk along the track and thus move window, without any forces pushing the gear out of the rack, as would occur with slanted rack and gear teeth.

In one embodiment, the portion of the rack tooth that is generally perpendicular to the plane is at least ten percent of the height of the rack tooth 6. In another embodiment, the portion of the rack tooth 6 that is generally perpendicular to the plane 17 is at least twenty percent of the total height of the rack tooth 6. In a preferred embodiment, the portion of the rack tooth 6 that is generally perpendicular to the plane 17 is one third of the total height of the rack tooth 6. In yet another embodiment, the portion of the rack tooth 6 that is generally perpendicular to the plane 17 is between 35% and 50% of the total height of the rack tooth 6. In FIG. 2A, there are five rack teeth 6 per inch. However, in another embodiment, there are six to eight rack teeth 6 per inch. In yet another embodiment, there are between ten and twelve rack teeth 6 per inch. Additionally, in FIG. 2A, there are 18 gear teeth 4 on the gear 3. In another embodiment, however, there are as many as 30 gear teeth 4 on the gear. In yet another embodiment, there are as few as eight gear teeth 4 on the gear.

FIG. 2B depicts a worm gear 16 meshed with the rack teeth 6. A worm gear 16 interlocks with the rack teeth 6 and the gear is powered by the motor 15 such that the sliding component of the sliding window 2 moves. Where the gear is a worm gear 16, the rack 5 is attachable to the sliding component 10 or the stationary component 11 of the sliding window 2.

FIG. 2C depicts a helical gear 19 meshed with a rack 5. In this embodiment, the rack teeth 6 are angled such that they are able to mesh with the teeth of the helical gear 19.

FIG. 3 depicts a perspective view of a gear meshed with a rack 5. In this embodiment, the gear is disposed such that the sides of the rack tooth that do not face other rack teeth 27 face the space between the gear teeth 18 as the rack 5 and gear mesh. In another embodiment, such as the one depicted in FIG. 2C, the gear is disposed in the motor assembly 14 such that the generally rounded portion of the rack tooth 6, or the upper surface of the rack tooth, faces the space between the gear teeth 18 as the rack 5 and gear mesh.

Figure 4:
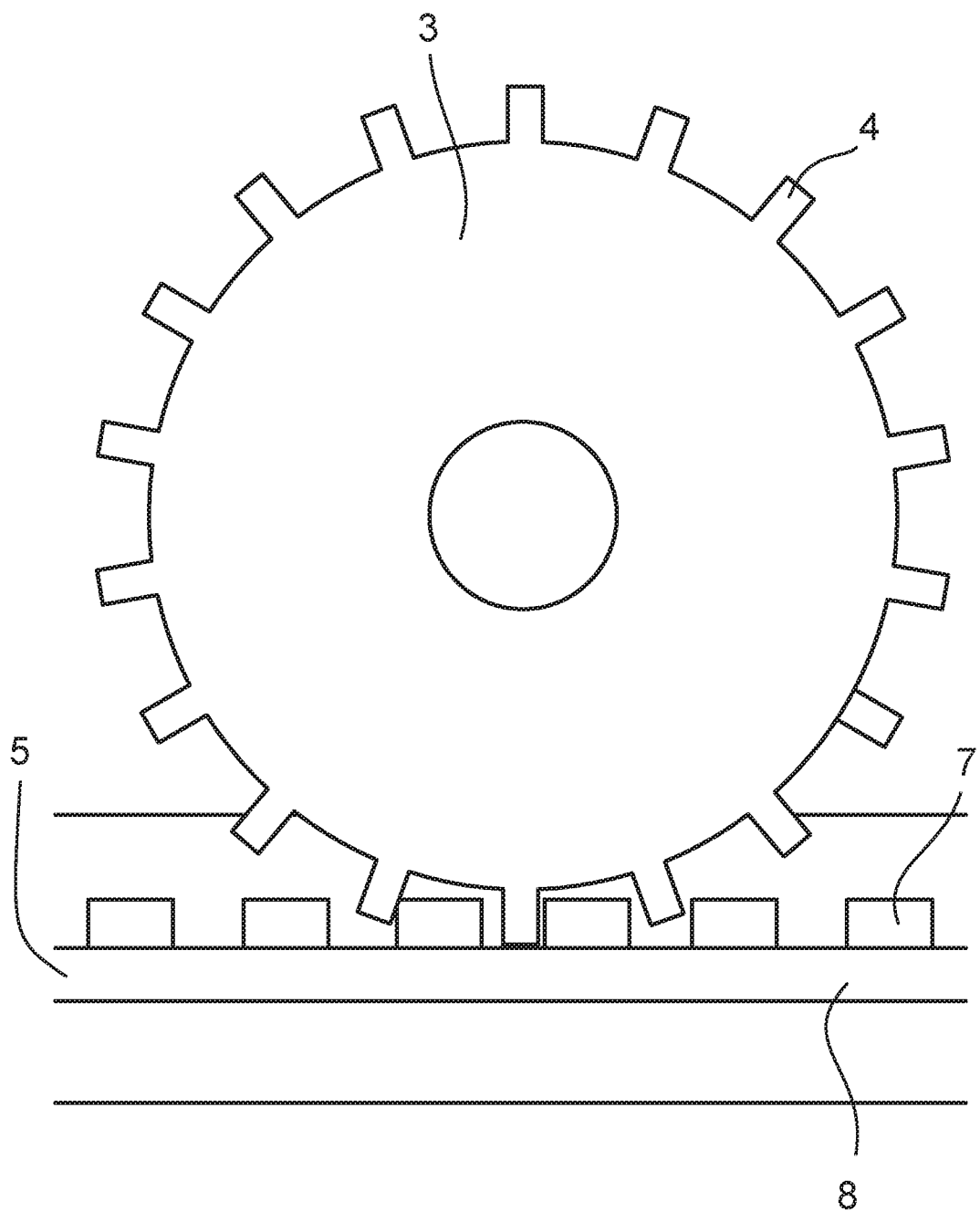
FIG. 4 depicts a rack with square shaped rack teeth.

FIG. 4 depicts a rack 5 with square shaped rack teeth 6. The rack tooth 6 is comprised of four side surfaces, a lower surface which attaches to the rack base, and an upper surface that, in this embodiment, is a square shape. In another embodiment, the upper surface of the rack tooth 6 is rounded.

Figure 5A:
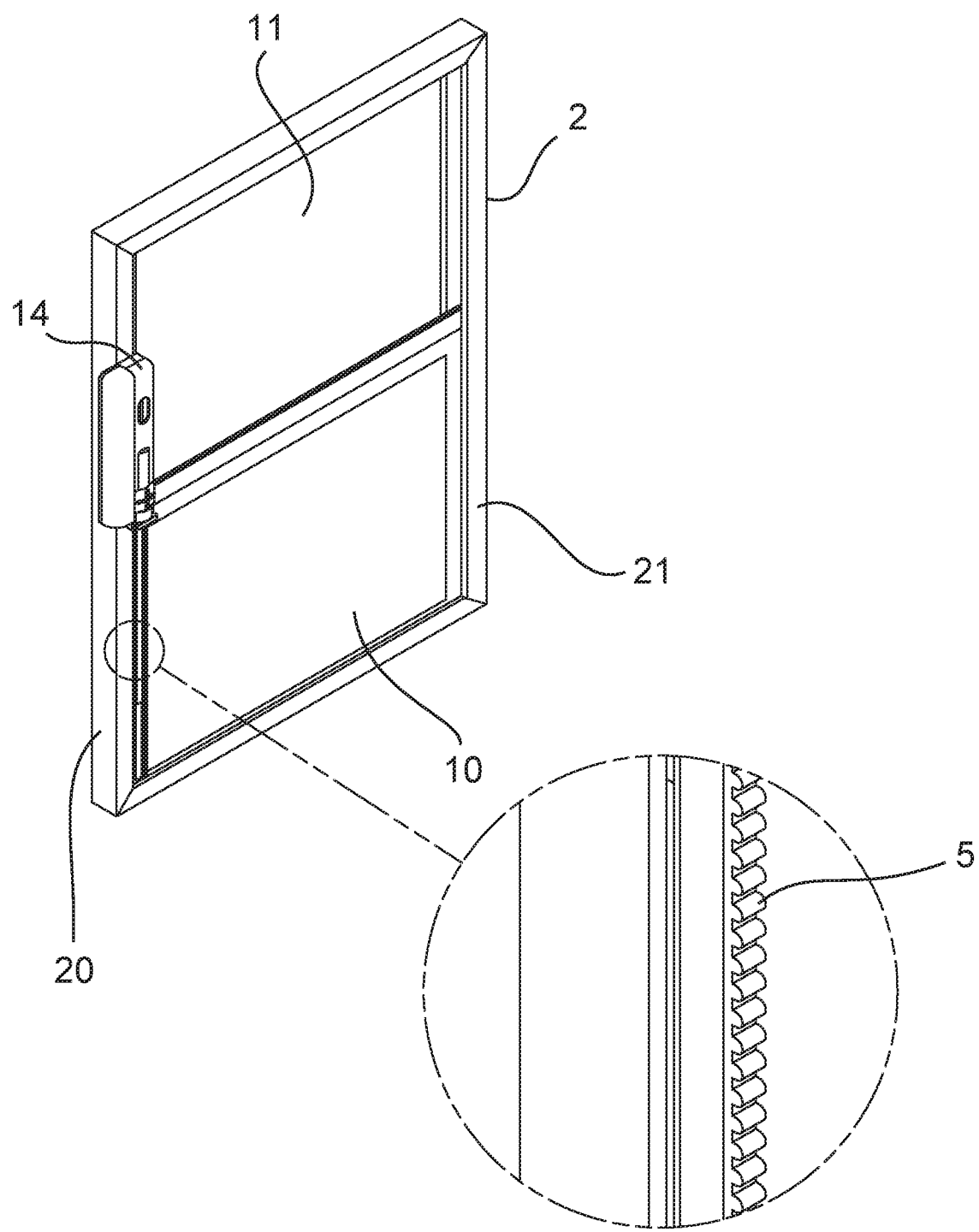
FIG. 5A shows a sliding window wherein the sliding component slides from a lower position to an upper position.

FIG. 5A shows a sliding window 2 wherein the sliding component 10 slides from a lower position to an upper position. In this embodiment, the sliding component 10 is in the lower position, that is, positioned below the stationary component 11, and the sliding window 2 is closed. Additionally, in this embodiment, the rack 5 is attached to the sliding component 10 and the motor assembly 14 is attached to the first vertical member 20 of the frame 12. In another embodiment, the motor assembly 14 is attached to the second vertical member 21 of the frame 12. In yet another embodiment, the rack 5 is attached to the outside of the window channel 13. The rack 5 may be attached to the inside of the window channel 13 such that the rack 5 faces towards the stationary component 11. However, in another embodiment, the rack 5 is attached to the outside of the window channel 13 such that the rack 5 does not face the sliding window 2, as seen in FIG. 5A, and instead faces towards the room in which the sliding window 2 is located.

Figure 5B:
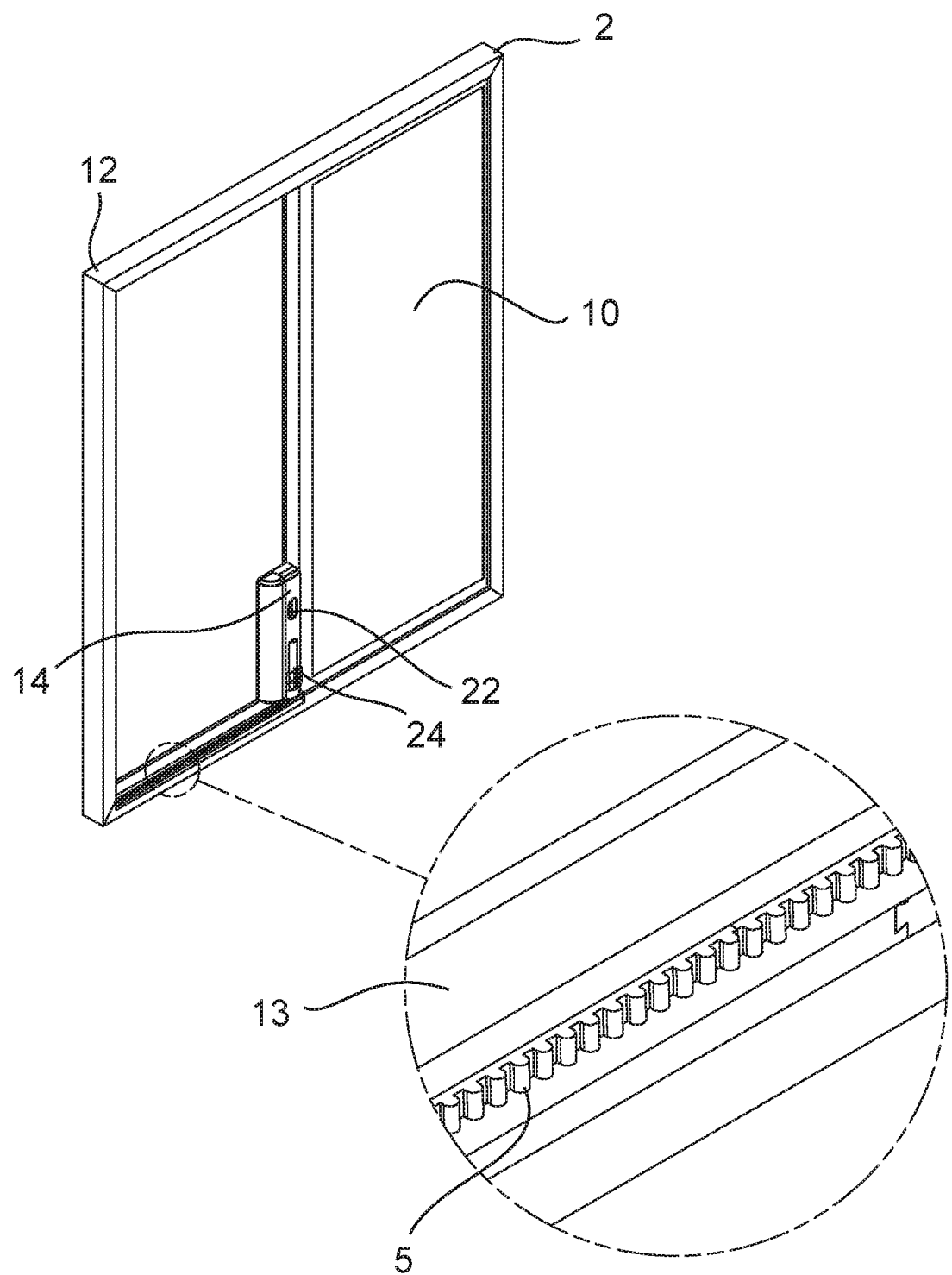
FIG. 5B depicts a sliding window wherein the sliding window slides from a first side to a second side.

FIG. 5B depicts a sliding window 2 wherein the sliding window 2 slides from left to right, and from right to left. In this figure, the motor assembly 14 comprises two buttons that allow a user to manually open or close the sliding window 2. A first button 22 moves the sliding component 10 to an open position, and a second button 24 moves the sliding component 10 to a closed position. In other embodiments, pressing the button 22 quickly fully opens the sliding component 10, while holding the first button 22 causes the sliding component 10 to open incrementally. Alternatively, rapidly pressing the closing button 24 causes the sliding component 10 to shut completely, while holding the closing button 24 causes the sliding component 10 to close incrementally. Additionally, FIG. 5B depicts the rack 5 attached to the outside of the window channel 13, with the rack teeth 6 facing towards the room in which the sliding window 2 is located.

Figure 6:
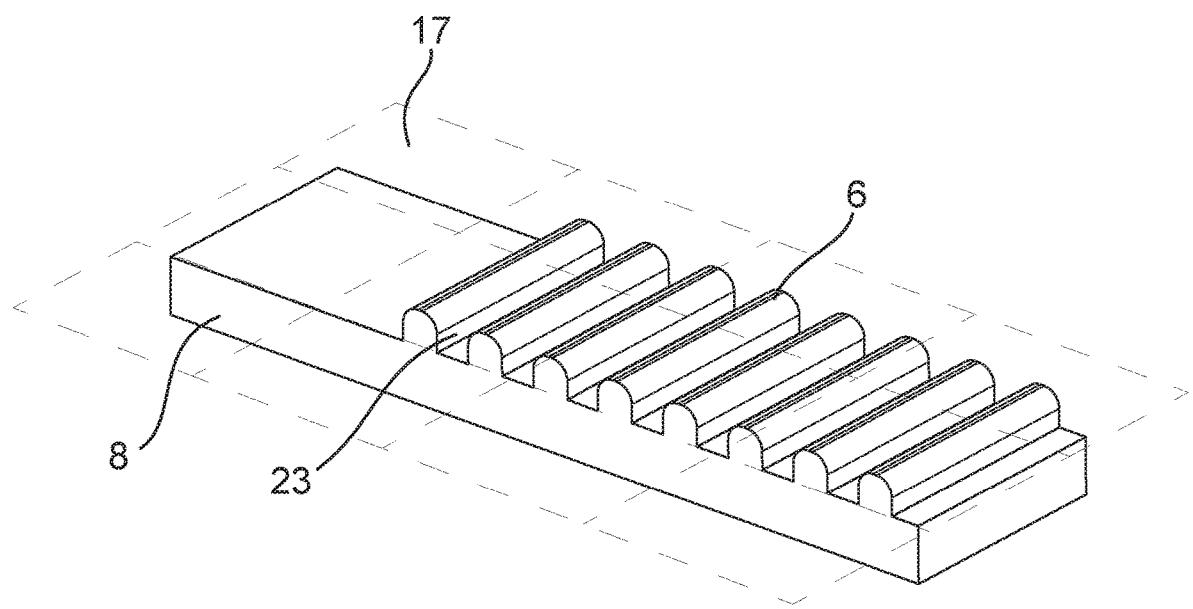
FIG. 6 depicts the rack and the plane of the rack.

FIG. 6 depicts the rack 5 and the plane 17. In this drawing, the sides of the rack tooth that face other rack teeth 23 are perpendicular to the plane 17 of the rack base 8. In a preferred embodiment, a 90-degree angle is created between the sides of the rack tooth that face other rack teeth 23 and the plane 17 created by the rack base 8. However, in another embodiment, an 85-degree angle is created between the sides of the rack tooth that face other rack teeth and the plane of the rack base. In yet another embodiment, a 95-degree angle is created between the sides of the rack tooth that face other rack teeth and the plane created by the rack base.

In one embodiment, the automated sliding panel mechanism is controlled by a controller. In a preferred embodiment, the controller is a smart phone running an app. This allows users to control the degree to which their window is opened from a distance by using their phone. In one embodiment, the app allows users to save preferences. For example, a user determines that they prefer the window to be half-way open from 6:00 am to 9:00 am, and then closed from 9:01 am to 7:00 pm. At 7:00 pm, the user prefers that the window is fully open until 11:00 pm. In a preferred embodiment, the app stores this information and opens and closes the sliding window 2 according to a user's preferences. In another embodiment, the automated sliding panel mechanism saves users' preferences regarding to what degree the window should be open, for how long, and at what time of day, and that these patterns are different for different seasons. For example, a user prefers that in the winter time, a sliding window 2 with the automated sliding panel mechanism 1 is half way open for one hour a day starting at noon. However, in the springtime, the same user prefers that the sliding window 2 is fully open for two hours in the morning beginning at 8:00 am, and two hours in the evening beginning at 5:00 pm. Additionally, the same user prefers that in the summer, the sliding window 2 is fully opened for three hours beginning at 5:00 am, and fully opened for another three hours beginning at 8:00 pm. These seasonal preferences are stored in the smart phone running the app and are set to automatically shift at the arrival of a new season. In another embodiment, however, a user sets the exact date that they want their patterns to change.

In another embodiment, the sliding component 10 of a sliding window 2 may slide from an upper position to a lower position, or a lower position to an upper position. In this embodiment, the automated sliding panel mechanism 1 is attachable to the side of the sliding window 2.

In some embodiments, the frame has a latching device that mates to a latching receiver attached to the sliding component 10, wherein mating prevents movement of the sliding component. In some embodiments, the latching receiver comprises a communication device that generates a signal when the latching device is mated and transmits that signal to the motor, wherein the signal deactivates the motor.

In some embodiments, the controller sends control signals to the device to operate in such a way to assure the safety of occupants in the building wherein the automated sliding panel mechanism is located. For example, CO detectors or smoke detectors may open windows upon detection of noxious gases. Ventilation fans at or near the window opening may also be turned on to actively promote the ventilation of these gases. Louvers or vents may also be opened to further ventilate the space. Other safety embodiments include closing all windows when air quality alerts indicate that exterior air is not healthy (red zone). This info may be relayed to the controller via the cloud-based network or from sensors. In an embodiment, the controller may close all windows, doors, louvers and shutters when high winds are in the area. This info may be determined by exterior sensors or weather reports via the cloud-based network.

In another embodiment, the controller may tie in with the building HVAC system in order to allow the HVAC system to open windows or louvers to let in cool air when the interior space is too hot. This allows the HVAC system to operate in an economizer mode when outdoor air temperature is cool so that the air conditioner does not have to be operated. This saves energy. Temperature sensors inside the building and outside of the building inform the controller. The fan of the HVAC system may be activated to draw air in through the open window (creating a negative air pressure within the building).

In another embodiment, exterior humidity or moisture sensors may inform the controller that rain or a water from sprinkler system is near a window opening. The controller may then close windows that are open that may be impacted by the water intrusion. Weather reports from an online service may also inform the controller to enable this operation.

In another embodiment, sensors may be located inside or outside of the building at locations near the window, door or louver opening or far away. These sensors may inform the controller regarding conditions that impact the operation of the device. For example, temperatures at or near the window may be different than the outdoor temperature or the temperature in other parts of the building. Decisions regarding the opening and closing of a window may depend on not only the temperature at the window, but also other locations inside and outside of the building.

In certain embodiments, the app is configured to execute on a user's mobile device, such as a tablet or smart phone.

A light sensor may sense light levels at or around a window. Various types of light sensors, including photovoltaic cells, cameras, photo diodes, proximity light sensor, or the like, may be used depending on the application. In an embodiment, the solar panel may be used as a light sensor. In certain embodiments, a light sensor may sense light external to a window. This may allow an automated window to open or close or increase and decrease opacity in response to lighting conditions outside a building. For example, an automated window may be configured to open at sunrise and close at sunset. Alternatively, or additionally, an automated window may be configured to open (either fully or partially) when conditions are overcast, thereby letting more light into a room or space, and close (either fully or partially) in response to detecting full sunlight, thereby letting less light into a room or space. In certain embodiments, a light sensor may be used to determine a total amount of light energy entering a room or space through a window. This information may be used to adjust an automated window or to adjust HVAC system parameters. In another embodiment, the window may be closed upon detection of water or moisture from an environmental sensor.

A light sensor may also be configured to sense light levels internal to a window, such as within a room or interior space. This may allow an automated window to be adjusted based on interior light levels. For example, an automated window may be opened in response to lower levels of interior light and closed in response to higher levels of interior light. In certain embodiments, various algorithms may be used to adjust automated windows in response to both exterior and interior light levels, as opposed to just one or the other. Thus, in certain embodiments light sensors may be provided to sense both exterior and interior light levels.

In certain embodiments, the opening and closing of automated windows may be coordinated with the turning on or off of lights in a room or space. For example, if lights in a room are turned off, automated windows may be opened to compensate for the reduced amount of light. This allows natural light to replace artificial light and creates opportunities for conserving energy. In certain embodiments, lights may be automatically turned off and automated windows may be automatically opened to replace artificial light with natural light when conditions allow. In such embodiments, the automated windows and interior lighting may be controlled by a home automation platform or other controller to provide desired amounts of light in a room or space while simultaneously conserving energy.

A temperature sensor may be used to sense temperature at or around a window associated with the automated window. In certain embodiments, the temperature sensor is configured to sense a temperature external to a window. For example, an infrared thermometer may be used to infer the temperature external to a window by detecting thermal radiation emitted from objects outside the window. In other embodiments, the temperature sensor is configured to sense a temperature internal to the window. In yet other embodiments, the temperature sensor is configured to sense a temperature of the window itself.

In certain embodiments, an automated window may be adjusted based on a temperature sensed by the temperature sensor. For example, if an interior temperature of a room is deemed to be too low, the automated window may open to let in additional sunlight and warm the room. Similarly, if the interior temperature of the room is deemed to be too high, the automated window may close to reduce an amount of sunlight entering the room.

The automated window may also use the temperature sensor to anticipate changes in temperature. For example, if an exterior temperature or temperature of a window decreases (indicating it is getting colder outside), the automated window may be configured to open the windows and cool a room in an effort to mitigate anticipated warming of the room. Similarly, if an exterior temperature or temperature of a window increases (indicating it is getting warmer outside), the automated window may be configured to close the windows in an effort to mitigate anticipated warming of the room.

Due to the placement of automated windows at or near windows, an automated window in accordance with the invention may also advantageously include security sensors to monitor security at or near a window. In one embodiment, the security sensor is a proximity sensor configured to detect opening and/or closing of a window or door. In another embodiment, the security sensor is an impact sensor configured to detect impacts on and/or breakage of a window. For example, an accelerometer may act as an impact sensor to detect an extent of force on a window. Different alerts or notifications may be sent to a user or other entity depending on the extent of the impact. For example, touching a window may trigger a low priority alert or notification. Larger forces (causing a window to break, for example) may trigger higher priority alerts or notifications. In some embodiments, high priority alerts may be configured to trigger gathering of camera footage at or near a window.

In another embodiment, the security sensor is a camera configured to gather video or still shots at or around a window. In certain embodiments, an LED or other lighting may be provided for recording video or still shots in low lighting conditions. The video or still shots may be streamed wirelessly to a centralized security system or stored on a motorized gearbox assembly for later retrieval. In other embodiments, the security sensor is a motion sensor configured to detect motion at or around a window. In yet other embodiments, the security sensor is an audio sensor configured to collect audio at or around a window. By incorporating security sensors into automated windows, security may be monitored at each window. In certain embodiments, information from the security sensors is relayed to a centralized security system. In other embodiments, an automated window in accordance with the invention may be configured to act as a centralized security system by gathering information from security sensors located at various automated windows. Such a centralized security system may, in certain embodiments, send notifications to a user, smart device, security company, law enforcement office, or the like, when breaches of security are detected.

The sensors may also, in certain embodiments, include safety sensors such as smoke detectors, carbon monoxide sensors, or the like. Outfitting automated windows with such sensors may provide a large number of sensors at prime locations throughout a home or business, while at the same time eliminating or reducing the need to equip a home or business with separate independent sensors. In certain embodiments, alerts or notifications may be sent to a user or first responder when smoke, carbon monoxide, or other critical substances or gases have been detected.

A current/voltage sensor may be provided to sense current or voltage associated with the motors or actuators. In certain embodiments, this information may be used to ensure that a motor or actuator is not overloaded. The current/voltage may also be used to calibrate the automated window. For example, when the automated window is fully closed (i.e., have reached their maximum position), the current of the motor or actuator may spike in response to their non-movement. This spike in current may indicate that a maximum position has been reached. The position of the window may be recorded at this point (using the position encoder) to remember the maximum position. The automated window may then be moved in the opposite direction until they stop (i.e., reach their minimum or fully open position). The current of the motor or actuator may again spike in response to the non-movement of the window. This spike may indicate that a minimum position has been reached. The minimum position may be recorded. In this way, the current/voltage sensor may be used in conjunction with the position encoder to learn the range of motion and stopping points of the motorized window. In certain embodiments, this calibration technique may be performed when the automated window is initially powered up or installed. Once the calibration is performed, the motorized window may, through various calculations, move the window to any desired position between the stopping points. The current/voltage sensor may, along with the position encoder, be used to estimate a size of an automated window. Knowing the size of the automated window may be used to prevent over-torqueing of the motorized window mechanisms.

An automated window in accordance with the invention may also be configured to interface with external sensors. Although various sensors (as previously discussed) may be located in the automated window or in close proximity to the automated window, other sensors may be located external to the automated window and, in some cases, be far removed from the automated window. For example, a temperature sensor located in one part of a building may be used to trigger operation of automated windows in other parts of the building. In other cases, readings from multiple sensors located throughout a building may be used to influence operation of an automated window or a group of automated windows. In certain cases, data may be gathered from external sensors and wirelessly communicated to an automated window or group of automated windows.

As previously mentioned, an automated window or group of automated windows in accordance with the invention may also be controlled (e.g., wirelessly controlled) by external switches, such as a remote control or a specialized wall switch. These switches may provide additional mechanisms for controlling an automated window or group of automated windows. In certain cases, a wall switch or remote control may provide a faster and more convenient way to control an automated window or group of automated windows than an application. In certain embodiments, an external switch in accordance with the invention may provide functionality to control devices other than automated windows.

Preferably, the rack 5 is comprised of plastic. However, in another embodiment, the rack is comprised of rubber.

All patents and published patent applications referred to herein are incorporated herein by reference. The invention has been described with reference to various specific and preferred embodiments and techniques. Nevertheless, it understood that many variations and modifications may be made while remaining within the spirit and scope of the invention.

What is claimed is:

1. An automated sliding window mechanism comprising:
a motor attached to a first component of a sliding window and configured to move the sliding window between a closed position and an open position, defining a direction of movement for the sliding window,
a power source, providing power to the motor,
a rack attached to a second component of the sliding window and comprising a base with rack teeth extending from a plane thereof, wherein an engagement portion of each rack tooth is generally perpendicular to the plane and generally perpendicular to the direction of movement; and
a gear rotated by the motor comprising gear teeth shaped to mesh with the rack teeth, wherein each gear tooth has an engagement portion that, when engaging a rack tooth, is generally perpendicular to the plane and generally perpendicular to the direction of movement.

2. The invention of claim 1, wherein the gear is a spur gear.

3. The invention of claim 1, wherein the motor is attached to a sliding component of the sliding window, and the rack is attached to a stationary component of the sliding window.

4. The invention of claim 1, wherein the motor is attached to a stationary component of the sliding window, and the rack is attached to the sliding component of the sliding window.

5. The invention of claim 1, wherein the gear is comprised of at least 12 teeth.

6. The invention of claim 1, wherein the gear is comprised of no more than 30 teeth.

7. The invention of claim 1, wherein the rack is comprised of at least six teeth per inch.

8. The invention of claim 1, further comprising a controller, wherein the controller controls the motor.

9. The invention of claim 8, wherein the controller is a smart phone running an app.

10. The invention of claim 1, wherein the rack teeth have ends, and wherein the ends of the rack teeth are generally rounded.

11. The invention of claim 1, wherein the rack teeth have ends, and wherein the ends of the rack teeth are square.

12. The invention of claim 1, wherein the rack is attached to the sliding window with an adhesive.

13. The invention of claim 1, wherein the rack, motor, and gear are attached to an upper portion of the sliding window or a lower portion of the sliding window, or to a first or second vertical side.

14. The invention of claim 1, further comprising buttons attached to a motor assembly comprised of the gear and the motor, for opening or closing the sliding panel.

15. The invention of claim 1, wherein the rack is attached to the sliding window such that the rack faces towards the window.

16. The invention of claim 1, wherein the rack is attached to the sliding window such that the rack faces away from the window.

17. The invention of claim 1, wherein the rack teeth have a generally rounded portion at an end of the rack teeth, and wherein the gear is disposed such that spaces between the gear teeth and a generally rounded portion of the rack teeth mesh.

* * * * *